United States Patent
Shin et al.

(10) Patent No.: US 11,227,088 B1
(45) Date of Patent: Jan. 18, 2022

(54) METHOD FOR SIMULATING SEMICONDUCTOR DEVICE

(71) Applicant: KOREA ADVANCED INSTITUTE OF SCIENCE AND TECHNOLOGY, Daejeon (KR)

(72) Inventors: Mincheol Shin, Daejeon (KR); SeongHyeok Jeon, Daejeon (KR)

(73) Assignee: Korea Advanced Institute of Science and Technology, Daegu (KR)

( * ) Notice: Subject to any disclaimer, the term of this patent is extended or adjusted under 35 U.S.C. 154(b) by 0 days.

(21) Appl. No.: 16/951,351

(22) Filed: Nov. 18, 2020

(30) Foreign Application Priority Data

Nov. 5, 2020 (KR) .......................... 10-2020-0146948

(51) Int. Cl.
*G06F 30/30* (2020.01)
*G06F 30/3308* (2020.01)
*G06F 30/367* (2020.01)
*G06F 111/10* (2020.01)
*G06F 119/06* (2020.01)

(52) U.S. Cl.
CPC ........ *G06F 30/3308* (2020.01); *G06F 30/367* (2020.01); *G06F 2111/10* (2020.01); *G06F 2119/06* (2020.01)

(58) Field of Classification Search
CPC ............... G06F 30/3308; G06F 30/367; G06F 2111/10; G06F 2119/06; G06F 30/30–398; G06F 2111/00–2119/22
See application file for complete search history.

(56) References Cited

U.S. PATENT DOCUMENTS

| 9,858,365 B2* | 1/2018 | Klimeck | G06F 30/20 |
| 9,881,111 B2* | 1/2018 | Liu | G06F 30/327 |
| 2011/0313741 A1* | 12/2011 | Langhoff | G16C 20/30 703/2 |

(Continued)

FOREIGN PATENT DOCUMENTS

| JP | H05267421 A | * 10/1993 | G06F 17/50 |
| JP | 3993008 B2 | * 10/2007 | G06F 17/50 |

OTHER PUBLICATIONS

W.J. Jeong et al., "Efficient TB-NEGF Simulations of Ultra-Thin Body Tunnel FETs," Simulation of Semiconductor Processes and Devices, 2016 IEEE, pp. 81-84. (Year: 2016).*

(Continued)

*Primary Examiner* — Leigh M Garbowski
(74) *Attorney, Agent, or Firm* — Harness, Dickey & Pierce, P.L.C.

(57) ABSTRACT

Provided is a method for simulating a semiconductor device. The method includes extracting a Hamiltonian and an overlap matrix of a semiconductor device using a density functional theory or a tight-binding method, calculating each of Bloch states for each corresponding energy, obtaining a first reduced Hamiltonian and a first reduced overlap matrix with a reduced matrix size, and calculating a final transformation matrix and a final energy band structure in which all of unphysical branches, wherein the semiconductor device includes a source region, a drain region, and a channel region between the source region and the drain region, wherein the channel region includes unit cells, each of which includes different material or has different structure.

14 Claims, 5 Drawing Sheets

(56) References Cited

U.S. PATENT DOCUMENTS

| | | | | |
|---|---|---|---|---|
| 2015/0142398 A1* | 5/2015 | Miller, III | ............. | G16C 10/00 703/2 |
| 2018/0129765 A1* | 5/2018 | Stokbro | ................ | G06F 30/367 |
| 2018/0293342 A1 | 10/2018 | Shin et al. | | |

OTHER PUBLICATIONS

F. Ducry et al., "A Hybrid Mode-Space/Real-Space Scheme for DFT-NEGF Device Simulations," 2019 Int'l Conference on Simulation of Semiconductor Processes and Devices (SISPAD), IEEE, 4 pages. (Year: 2019).*

Mincheol Shin et al., Density functional theory based simulations of silicon nanowire field effect ransistors, Journal of Applied Physics 119, 154505 (2016).

A. Afzalian et al., "Physics and performances of III-V nanowire broken-gap heterojunction TFETs using an efficient tight-binding mode-space NEGF model enabling million-atom nanowire simulations", Journal of Physics: Condensed Matter, 2018.

Fabian Ducry et al., "Hybrid Mode-Space-Real-Space Approximation for First-Principles Quantum Transport Simulation of Inhomogeneous Devices", Physical Review Applied 13, 044067 (2020).

Jun Z. Huang et al., "Robust mode space approach for atomistic modeling of realistically large nanowire transistors", J. Appl. Phys. 123, 044303 (2018).

Gennady Mil'nikov et al., "Equivalent transport models in atomistic quantum wires", Physical Review B 85, 035317 (2012).

M. G. Pala et al., "Unit cell restricted Bloch functions basis for first-principle transport models: Theory and application", Physical Review B 102, 045410 (2020).

Chin-Yi Chen et al., "Impact of body thickness and scattering on III-V triple heterojunction Fin-TFET modeled with atomistic mode space approximation", arXiv2002.04220v1 [physics.app-ph], Feb. 11, 2020.

* cited by examiner

METHOD FOR SIMULATING SEMICONDUCTOR DEVICE

CROSS-REFERENCE TO RELATED APPLICATIONS

This U.S. non-provisional patent application claims priority under 35 U.S.C. § 119 of Korean Patent Application No. 10-2020-0146948, filed on Nov. 5, 2020, the entire contents of which are hereby incorporated by reference.

BACKGROUND

The present disclosure herein relates to a method for simulating a semiconductor device, and more particularly, to a method for simulating a semiconductor device having a heterogeneous structure.

As research and development has been carried out to develop highly integrated and small-size transistors, transistors are commercialized using 100-nm or less CMOS manufacturing technology. Furthermore, technologies for forming a channel of a transistor to a length of 10 nm or less have been recently developed, and research and development is being carried out to develop a process of manufacturing three-dimensional devices such as ultra-thin body (UTB), FinFET, gate-all-around (GAA) FET, and the like.

As a channel length decreases to several nano meters, the number of atoms in a device decreases to several hundred or thousand, and thus the influence of interactions between single atoms increases. Accordingly, an atom-level modeling approach is necessary. This approach may be implemented based on the wave nature of electrons, that is, a quantum mechanical simulation based on a Schrodinger equation.

Meanwhile, a size of Hamiltonian that contains atomic information in a simulation is proportional to the number of atoms in a unit cell and the number of atomic orbitals. Therefore, when a simulation is applied to transistor devices that are currently developed, a several million-by-several million matrix calculation is performed, thus requiring a very large-size memory and a long calculation time. Therefore, researches are being carried out to reduce a time and memory required for a calculation by reducing the size of Hamiltonian.

SUMMARY

The present disclosure provides a semiconductor device simulation method based on a density functional theory (DFT) and/or tight-binding (TB) method for calculating an energy band structure and voltage-current characteristic by reducing a Hamiltonian.

The purposes of the present disclosure are not limited to the above-mentioned purposes, and other purposes not mentioned would be clearly understood by those skilled in the art from the disclosure below.

An embodiment of the inventive concept provides a method for simulating a semiconductor device, the method including: extracting a Hamiltonian and an overlap matrix of a semiconductor device using a DFT or a TB method; calculating, based on the Hamiltonian, the overlap matrix, and an energy-wavenumber relation within an effective energy region, each of Bloch states for each corresponding wave number and energy; obtaining a first reduced Hamiltonian and a first reduced overlap matrix with a reduced matrix size by applying to the Hamiltonian and the overlap matrix a transformation matrix obtained by orthonormalizing a matrix representing the Bloch states; and calculating a final transformation matrix and a final energy band structure in which all of unphysical branches (UPB), which are energy bands not corresponding to a first energy band structure in a second energy band structure, are removed from the effective energy region by comparing the first energy band structure calculated based on the Hamiltonian and the overlap matrix with the second energy band structure calculated based on the first reduced Hamiltonian and the first reduced overlap matrix, wherein the semiconductor device includes a source region, a drain region, and a channel region between the source region and the drain region, wherein the channel region includes a plurality of unit cells, each of which includes different material or has different structure.

In an embodiment, the unit cells may have a structure that is symmetric or asymmetric with respect to a center of the channel region.

In an embodiment, removing the unphysical branches may be performed by checking whether the unphysical branches exist in the effective energy region of a periodic super cell structure including the unit cells and repeating a band calculation by sequentially updating the transformation matrix for the unit cells if the unphysical branches exist.

In an embodiment, the calculating of the final transformation matrix and the final energy band structure may include: calculating a second eigenvalue number that is the number of eigenvalues included in the second energy band structure; comparing the second eigenvalue number with a first eigenvalue number that is the number of eigenvalues included in the first energy band structure; generating an additional basis for removing the unphysical branches from the effective energy region and adding the additional basis to the transformation matrix when the second eigenvalue number is greater than the first eigenvalue number; and determining the transformation matrix to which the additional basis is added as the final transformation matrix when the second eigenvalue number converges to the first eigenvalue number.

In an embodiment, the adding of the additional basis to the transformation matrix may include: recalculating the second eigenvalue number in an energy band obtained by the transformation matrix to which the additional basis is added; and generating a new additional basis for removing the unphysical branches from the effective energy region and further adding the new additional basis to the transformation matrix when the recalculated second eigenvalue number is greater than the first eigenvalue number.

In an embodiment, the adding of the additional basis to the transformation matrix may be performed through repetition of recalculating the second eigenvalue number and generating and adding the additional basis to the transformation matrix until the second eigenvalue number converges to the first eigenvalue number.

In an embodiment, the additional basis may be generated based on a variable vector calculated through a minimization function that maximizes an absolute value of a difference between the second eigenvalue number obtained by an ith transformation matrix (where i is a natural number) to which an ith additional basis is applied and the second eigenvalue number obtained by an (i−1)th transformation matrix to which an (i−1)th additional basis is applied.

In an embodiment, the obtaining of the first reduced Hamiltonian and the first reduced overlap matrix may include: generating an orthonormal basis obtained by orthonormalizing the matrix representing the Bloch states; outputting the transformation matrix in which states not meeting a preset threshold value are removed from the orthonormal matrix; and outputting the first reduced Hamiltonian and the first reduced overlap matrix by applying the Hamiltonian and the overlap matrix to the transformation matrix.

In an embodiment, the effective energy region may be set based on at least one of a conduction band edge or a valence band edge according to a type of the semiconductor device.

In an embodiment, each of the Bloch states may be calculated from the Hamiltonian and the overlap matrix using an eigenvalue solving method for a Schrodinger equation.

The method may further include calculating a current characteristic of the semiconductor device based on a second reduced Hamiltonian and the first reduced overlap matrix obtained by adding an initial external potential to the first reduced overlap matrix and the first reduced Hamiltonian.

In an embodiment, the calculating of the current characteristic of the semiconductor device may include: obtaining the second reduced Hamiltonian based on the first reduced Hamiltonian, the first reduced overlap matrix, and the initial potential; calculating an electron density by applying the second reduced Hamiltonian and the first reduced overlap matrix to a non-equilibrium Green's function (NEGF); updating the initial potential by applying the electron density to a Poisson's equation; calculating a potential difference between the initial potential and the updated potential of the second reduced Hamiltonian; calculating a current density and a current using the updated potential when the potential difference is equal to or less than a predetermined threshold value; and updating the second reduced Hamiltonian with the updated potential when the potential difference exceeds the threshold value.

In an embodiment, the potential and the second reduced Hamiltonian may be updated by repeatedly solving the Poisson's equation and the NEGF in a self-consistent manner until the potential difference converges to the threshold value or less.

In an embodiment, the semiconductor device may be a field-effect transistor having a structure of bulk, ultra-thin body (UTB), fin, nanowire, or gate-all-around (GAA).

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
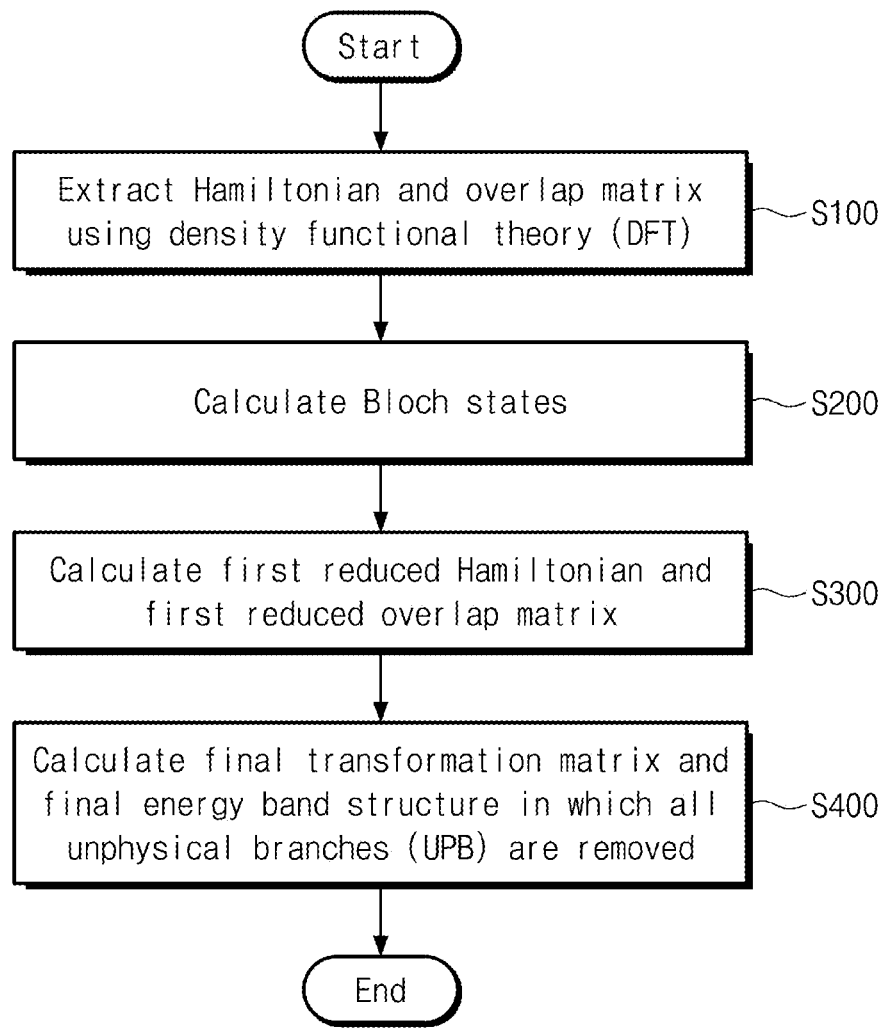
FIG. 1 is a flowchart illustrating a method for simulating a semiconductor device according to embodiments of the inventive concept.

Hereinafter, embodiments of the inventive concept will be described with reference to the accompanying drawings so that the configuration and effects of the inventive concept are sufficiently understood.

The inventive concept is not limited to the embodiments described below, but may be implemented in various forms and may allow various changes and modifications. Rather, the embodiments are provided so that this disclosure will be thorough and complete, and will fully convey the scope of the inventive concept to those skilled in the art. In the accompanying drawings, the scale ratios among elements may be exaggerated or reduced for convenience.

The terminology used herein is not for limiting the invention but for describing particular embodiments. Furthermore, the terms used herein may be interpreted as the meanings known in the art unless the terms are defined differently.

The terms of a singular form may include plural forms unless otherwise specified. It will be further understood that the terms "includes", "including", "comprises", and/or "comprising", when used in this description, specify the presence of stated elements, steps, operations, and/or components, but do not preclude the presence or addition of one or more other elements, steps, operations, and/or components.

The terms "first", "second", and the like are used herein to describe various regions, directions, shapes, etc., but these regions, directions, and shapes should not be limited by these terms. These terms are only used to distinguish one region, direction, or shape from another region, direction, or shape. Therefore, a part referred to as a first part in an embodiment may be referred to as a second part in another embodiment. The embodiments described herein also include complementary embodiments thereof. Like reference numerals refer to like elements throughout.

Hereinafter, a method for simulating a semiconductor device according to an embodiment of the inventive concept will be described with reference to the accompanying drawings.

FIG. 1 is a flowchart illustrating a method for simulating a semiconductor device according to embodiments of the inventive concept.

Referring to FIG. 1, a method for simulating a semiconductor device according to an embodiment of the inventive concept may include: extracting a Hamiltonian and an overlap matrix indicating interatomic interaction energy information about a target semiconductor device using a density functional theory (DFT) and/or a tight-binding (TB) method (S100); calculating, on the basis of the Hamiltonian, the overlap matrix, and an energy-wavenumber E-k relation within an effective energy region, each of Bloch states for the energy region (S200); calculating a reduced Hamiltonian and a reduced overlap matrix with a reduced matrix size by applying the Hamiltonian and the overlap matrix to a transformation matrix that is an orthonormal basis obtained by orthonormalizing a matrix representing the Bloch states (S300); and calculating a final transformation matrix and a final energy band structure in which all of unphysical branches (UPB), which are energy bands not corresponding to a first energy band structure in a second energy band structure, are removed from the effective energy region by comparing the first energy band structure based on the Hamiltonian and the overlap matrix with the second energy band structure based on the reduced Hamiltonian and the reduced overlap matrix (S400).

The DFT is a method for calculating a base electron energy that is a "function of function" by substituting a probability function indicating a probability of presence of an electron in a specific location within an orbit with an electron density function. According to this method, electron-electron repulsive energy is divided into a coulomb term and an exchange term to consider each correlation energy.

According to the TB method, Hamiltonian matrix elements are parameterized so as to be approximated so that an energy-wavenumber relation calculated through the DFT may be reproduced. Compared to the DFT, Hamiltonian configuration may be relatively easy.

According to the method for simulating a semiconductor device according to an embodiment of the inventive concept, energy band information about a channel region of a semiconductor device may be obtained using a quantum mechanical method. The semiconductor device may include various field-effect transistors (FETs) having a structure of bulk, ultra-thin body (UTB), fin, nanowire, gate-all-around (GAA), etc. Furthermore, according to the method for simulating a semiconductor device according to an embodiment of the inventive concept, a non-equilibrium Green's function (NEGF) and a Poisson function may be solved using a self-consistent technique to calculate a charge density and a current of a semiconductor device, and I-V characteristics of the semiconductor device may be obtained according to the charge density and the current.

Figure 2:
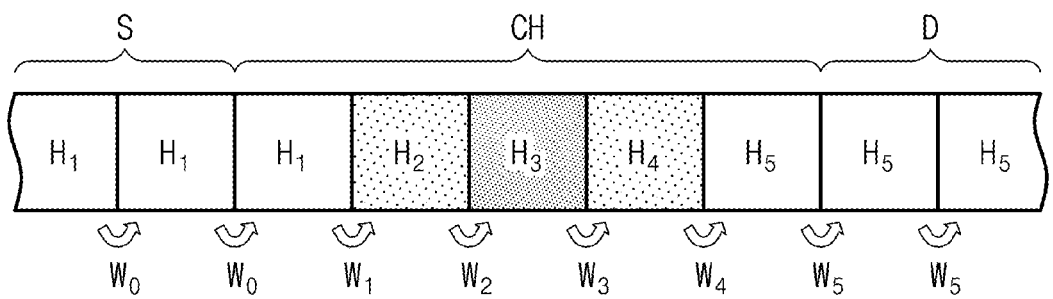
FIG. 2 is a conceptual diagram illustrating a portion of a semiconductor device that is a target of a simulation method according to embodiments of the inventive concept.

FIG. 2 is a conceptual diagram illustrating a portion of a semiconductor device that is a target of a simulation method according to embodiments of the inventive concept.

The semiconductor device that is a target of a simulation method according the inventive concept may include a source region S, a drain region D, and a channel region CH between the source region S and the drain region D. The channel region CH may include a plurality of unit cells, each of which includes different material or has different structure. Any one of the plurality of unit cells may be a trap or a defect. As a result, the simulation method according to the inventive concept may be applied to not only a homogeneous structure semiconductor device including unit cells that contain the same material and have the same structure but also a heterogeneous structure semiconductor device.

For example, in the channel region CH, one unit cell adjacent to the source region S may include the same material and have the same structure as the source region S, one unit cell adjacent to the drain region D may include the same material and have the same structure as the drain region D, and unit cells therebetween may include different materials or have different structures from those of the source region S and the drain region D. For example, in the case where the channel region CH includes five unit cells, the unit cells may include different materials or have different structures, and may have a structure that is symmetric with respect to a center unit cell. However, this is merely illustrative, and an embodiment of the inventive concept is not limited thereto, and, thus, the unit cells of the channel region CH may include different materials or have different structures, and may be asymmetric with respect to a center unit cell.

A structure of unit cells constituting an entirety or portion of this channel region CH referred to as a super cell structure herein.

For example, the simulation method according to the inventive concept may be performed on a super cell structure of a semiconductor device. In detail, a structure in which a super cell structure is periodically repeated may be formed, and a Hamiltonian and an overlap matrix for each of unit cells constituting the super cell structure may be extracted. The super cell structure of a semiconductor device is illustrated as including, for example, five unit cells, and a simulation method for the super cell structure having five unit cells is described below, but is merely illustrative.

The Hamiltonian for each unit cell may be expressed in a matrix form based on interatomic interaction energy information. For example, in the case where one unit cell includes only four atoms, a Hamiltonian H may be expressed as Equation 1 as below.

$$H = \begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix} \quad (1)$$

Here, $H_{ij}$ denotes energy of an atom, i.e., represents the energy of an ith atom itself when i and j are the same, and represents the coupling energy between i and j when i and j are different.

An energy-wavenumber E-k relation (i.e., energy-wavenumber band diagram) may be obtained from a Schrodinger equation expressed as Equation 2 as below.

$$\mathcal{H}_k \Psi_{v,k} = E_{v,k} \mathcal{S}_k \Psi_{v,k} \quad (2)$$

Here, $H_k$ denotes a Hamiltonian matrix representing a relation between atoms in a semiconductor device, $S_k$ denotes an overlap matrix, $E_{v,k}$ denotes an eigenvalue, and $\Psi_{v,k}$ denotes a wave function or Bloch state. $H_k$ may have a size of $N_{sc} \times N_{sc}$. $N_{sc}$ is expressed as a product of the number $N_{atm}$ of atoms included in a super cell and the number $N_{orb}$ of orbitals per atom, and the magnitude of matrix elements of $H_k$ may be determined according to a degree of interatomic interaction. For example, in the case of a super cell structure including five cells having a size of $N_{uc}$, an expression $N_{sc}=5 \times N_{uc}$ may be satisfied. In detail, $H_k$ and $S_k$ may be expressed as Equation 3 as below.

$$\mathcal{H}_k = \mathcal{H}_0 + e^{ik}\mathcal{W} + e^{-ik}\mathcal{W}^+, \mathcal{S}_k = \mathcal{S}_0 + e^{ik}\mathcal{S}_1 + e^{-ik}\mathcal{S}_1^+ \quad (3)$$

Here, $H_0$ denotes a Hamiltonian matrix for a super cell structure, W and $S_1$ denote matrices representing terms in which periodically repeated super cell structures are coupled, and $W^+$ and $S_1^+$ denotes Hermitian matrices of W and $S_1$ respectively. $H_0$, W, $S_0$, and $S_1$ may be obtained through a DFT or TB method, and may be expressed as Equation 4 as below.

$$\mathcal{H}_0 = \begin{bmatrix} H_1 & W_1 & 0 & 0 & 0 \\ W_1^+ & H_2 & W_2 & 0 & 0 \\ 0 & W_2^+ & H_3 & W_3 & 0 \\ 0 & 0 & W_3^+ & H_4 & W_4 \\ 0 & 0 & 0 & W_4^+ & H_5 \end{bmatrix}, \mathcal{W} = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \\ W_5 & 0 & 0 & 0 & 0 \end{bmatrix}, \quad (4)$$

-continued $$S_0 = \begin{bmatrix} S_{0,1} & S_{1,1} & 0 & 0 & 0 \\ S_{1,1}^+ & S_{0,2} & S_{1,2} & 0 & 0 \\ 0 & S_{1,2}^+ & S_{0,3} & S_{1,3} & 0 \\ 0 & 0 & S_{1,3}^+ & S_{0,4} & S_{1,4} \\ 0 & 0 & 0 & S_{1,4}^+ & S_{0,5} \end{bmatrix}, S_1 = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \\ S_{1,5} & 0 & 0 & 0 & 0 \end{bmatrix}$$

Here, $H_i$ (i=1, 2, 3, 4, 5) denotes a Hamiltonian matrix for an ith unit cell of a super cell structure, $W_i$ denotes a matrix representing a relation between an ith unit cell and an (i+1)th unit cell adjacent thereto, $S_{0,i}$ denotes an overlap matrix for an ith unit cell, and $S_{1,i}$ denotes an overlap matrix related to a relation between an ith unit cell and an (i+1)th unit cell adjacent thereto. For example, $H_i$ may be expressed as Equation 1.

An energy-wavenumber band diagram may be calculated by obtaining energy for each wavenumber by solving an eigenfunction expressed as Equation 2. That is, a Hamiltonian and an overlap matrix may be extracted in consideration of an interatomic interaction using the DFT or TB method, and a Schrodinger equation for the Hamiltonian and the overlap matrix may be solved so as to calculate an energy-wavenumber band structure. Thereafter, Bloch states may be calculated on the basis of the overlap matrix and the energy-waveform band structure.

The Bloch states may be expressed as a wave function for a particle on a periodic potential. The effective energy region may be set on the basis of at least one of a conduction band edge or a valence band edge according to the type of a semiconductor device. In general, when an energy band is calculated using the DFT or TB method, an energy band within a range of—several hundred eV to +several hundred eV is outputted. However, in the case of a semiconductor device, only the energy near band edges affects a transport calculation or the like. Therefore, a simulation may be performed by setting only an energy region near the band edges other than an entire energy region as the effective energy region.

For example, in the case of an n-channel metal oxide semiconductor (NMOS) transistor, the effective energy region may be set as a region between an energy level obtained by subtracting 1.0 eV from the conduction band edge and an energy level obtained by adding 1.0 eV to the conduction band edge. For another example, in the case of a p-channel metal oxide semiconductor (PMOS) transistor, the effective energy region may be set as a region between an energy level obtained by subtracting 1.0 eV from the valence band edge and an energy level obtained by adding 1.0 eV to the valence band edge. For another example, in the case of a tunnel-type transistor, the effective energy region may be set as a region between an energy level obtained by subtracting 1.0 eV from the valence band edge and an energy level obtained by adding 1.0 eV to the conduction band edge.

The Bloch state may be calculated within the range of the effective energy region by solving an eigenvalue problem from the Hamiltonian and the overlap matrix. For example, the Bloch states may be calculated every constant interval k, wherein a range of k may be expressed as Equation 5 as below.

$$k_p = \frac{2\pi p}{n_p} - \pi \,; p = 1, 2, \ldots, n_p \qquad (5)$$

The Bloch states calculated every constant interval k may be expressed as Equation 6 as below.

$$\mathcal{U}_S = \{\Psi_{v1,k1}, \Psi_{v2,k1}, \ldots \Psi_{v1,k2}, \Psi_{v2,k2}, \ldots\} \qquad (6)$$

Here, $U_S$ denotes a matrix having Bloch states as a column vector, $\Psi$ denotes Bloch states obtained by solving Equation 2 within a predetermined effective energy region, and $\Psi_{vj,ki}$ denotes a Bloch state for given $K_i$ values and $v_j$ values that are band indices at the $K_i$ values. $U_S$ may have a size of $N_{sc} \times N_{bs}$. $N_{bs}$ denotes the number of Bloch states.

An initial matrix $U_B$ may be obtained by orthonormalize $U_S$. The initial matrix $U_B$ may have block rows corresponding to the number of unit cells of a super cell structure, and may be expressed as Equation 7 as below.

$$\mathcal{U}_B = \begin{bmatrix} U_1 \\ U_2 \\ U_3 \\ U_4 \\ U_5 \end{bmatrix} \qquad (7)$$

Here, an initial transformation matrix $U_0$ may be obtained by diagonally transforming rows $U_1$, $U_2$, $U_3$, $U_4$, $U_5$ of $U_B$. The initial transformation matrix $U_0$ may be expressed as Equation 8 as below.

$$U_0 = \begin{bmatrix} U_1 & 0 & 0 & 0 & 0 \\ 0 & U_2 & 0 & 0 & 0 \\ 0 & 0 & U_3 & 0 & 0 \\ 0 & 0 & 0 & U_4 & 0 \\ 0 & 0 & 0 & 0 & U_5 \end{bmatrix} \qquad (8)$$

The initial transformation matrix $U_0$ may have a size of $N_{sc} \times N_{mode,\,0}$. $N_{mode,\,0}$ may be less than $5 \times N_{bs}$.

Thereafter, a first reduced Hamiltonian $H_k'$, and a first reduced overlap matrix $S_k'$ with a reduced matrix size may be calculated by applying to a Hamiltonian and an overlap matrix the initial transformation matrix $U_0$ obtained by orthonormalizing a matrix representing Bloch states. In detail, the first reduced Hamiltonian $H_k'$, and the first reduced overlap matrix $S_k'$ may be calculated by unitary transforming the Hamiltonian $H_k$ and the overlap matrix $S_k$ using the initial transformation matrix $U_0$. The first reduced Hamiltonian $H_k'$, and the first reduced overlap matrix $S_k'$ may be expressed as Equation 9 as below.

$$\mathcal{H}_k' = U_0^+ \mathcal{H}_k U_0$$

$$\mathcal{S}_k' = U_0^+ \mathcal{S}_k U_0 \qquad (9)$$

Thereafter, a band calculation for a super cell structure may be performed using the first reduced Hamiltonian $H_k'$, and the first reduced overlap matrix $S_k'$. All of unphysical branches UPB may be removed by checking whether an unphysical branch UPB is present in the effective energy region and repeating the band calculation while sequentially changing unit cells when an unphysical branch UPB is present.

Figure 3:
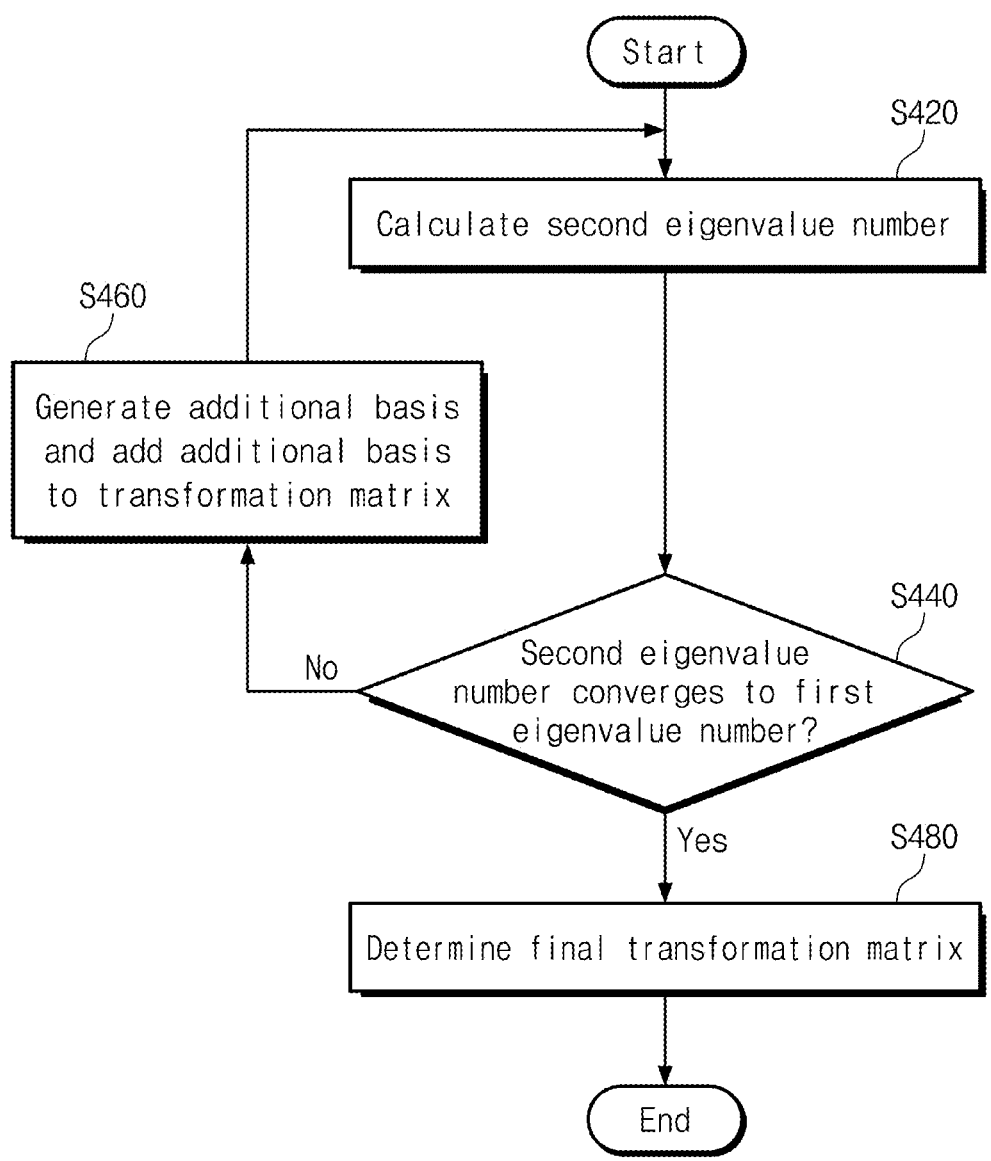
FIG. 3 is a flowchart illustrating a method for calculating a final transformation matrix and a final energy band structure in the method for simulating a semiconductor device according to embodiments of the inventive concept.

FIG. 3 is a flowchart illustrating a method for calculating a final transformation matrix and a final energy band structure in the method for simulating a semiconductor device according to embodiments of the inventive concept.

Referring to FIG. 3, the final transformation matrix and the final energy band structure in which all of unphysical branches (UPB), which are energy bands not corresponding to a first energy band structure in a second energy band structure, are removed from an effective energy region are calculated by comparing the first energy band structure calculated on the basis of the Hamiltonian $H_k$ and the overlap matrix $S_k$ with the second energy band structure calculated on the basis of the first reduced Hamiltonian $H_k'$ and the first reduced overlap matrix $S_k'$.

The first energy band structure may be a result of solving an eigenfunction expressed by Equation 2 and the initially calculated Hamiltonian $H_k$ and the overlap matrix $S_k$, and the second energy band structure may be a result of solving an eigenfunction expressed by Equation 2 and the first reduced Hamiltonian $H_k'$ and the first reduced overlap matrix $S_k'$. Here, the unphysical branches UPB not corresponding to the first energy band structure in the second energy band structure negatively affects a calculation of characteristics (e.g., transport calculation) of a semiconductor device, and, thus, an operation of removing the unphysical branches UPB is required to be performed.

In an embodiment, the unphysical branches UPB may be removed by comparing a first eigenvalue number, which is the number of eigenvalues of the first energy band structure, with a second eigenvalue number, which is the number of eigenvalues of the second energy band structure, within the effective energy region, and then repeatedly adding an additional basis U' to the initial transformation matrix $U_0$ until the second eigenvalue number converges to the first eigenvalue number. That is, the second eigenvalue number may be calculated (S420), the first eigenvalue number may be compared with the second eigenvalue number (S440), a first additional basis for removing the unphysical branches UPB from the effective energy region may be generated and added to the initial transformation matrix $U_0$ if the second eigenvalue number is greater than the first eigenvalue number (S460), and the transformation matrix to which the first additional basis is added may be determined as a final transformation matrix if the second eigenvalue number converges to the first eigenvalue number (S480). Here, the energy band structure obtained by the final transformation matrix may be substantially the same as an actual energy band structure of a target semiconductor device. In an embodiment, the convergence of the second eigenvalue number to the first eigenvalue number may be defined as cases where the second eigenvalue number is equal to the first eigenvalue number or is equal to or less than a predetermined range. That is, the second eigenvalue number cannot be less than the first eigenvalue number.

In an embodiment, a process of adding the additional basis to the initial transformation matrix $U_0$ may include repeating a process of recalculating the second eigenvalue number and generating and adding the additional basis to the transformation matrix until the second eigenvalue number converges to the first eigenvalue number. For example, when the second eigenvalue number is greater than the first eigenvalue number (or the second eigenvalue number is outside a preset range from the first eigenvalue), a process may be repeated, in which the second eigenvalue number is recalculated in an energy band obtained by the transformation matrix to which the first additional basis is added, the recalculated second eigenvalue number is compared with the first eigenvalue number, and, if the second eigenvalue number is greater than the first eigenvalue number, a second additional basis for removing the unphysical branches UPB from the effective energy region is generated and further added to the transformation matrix. For example, if a process of updating the initial transformation matrix $U_0$ by adding an additional basis is repeated n times, first to nth additional bases $U_1'$ to $U_n'$ are added to the initial transformation matrix U0 so that a final transformation matrix U may be ultimately calculated. That is, the final transformation matrix U may be expressed as Equation 10 as below.

$$U = [U_0 U_1' \ldots U_n'] \qquad (10)$$

The final transformation matrix U may provide an energy band structure in which all of unphysical branches UPB are removed within the effective energy region.

The first eigenvalue number and the second eigenvalue number may be calculated on the basis of Equation 11 below (S420).

$$N = \left(\frac{z - \varepsilon_0}{z - \varepsilon}\right) = \frac{1}{2n} \sum_{j=1}^{2n_g} \frac{z_j - \varepsilon_0}{z_j - \varepsilon} \text{ with } \varepsilon_0 = \frac{\varepsilon_1 + \varepsilon_2}{2}, \qquad (11)$$

$$z_k = \varepsilon_0 + \frac{\varepsilon_1 - \varepsilon_2}{2} e^{i\pi(k - 1/2)/n_g}$$

When a natural number $n_z$ is sufficiently large, N=1 is output when an input ε is within a range [ε1:ε2], and otherwise N=0 is output. Therefore, when Equation 11 is transformed into Equation 12 corresponding to a matrix so as to be applied to the Hamiltonian H, the number of eigenvalues (e.g., the first eigenvalue number or the second eigenvalue number) in a specific energy region may be calculated.

$$F[U] = \left\{ \sum_k Tr\left[\frac{1}{z - S_k'^{-1} \mathcal{H}_k'}\right] (z - \varepsilon_c) \right\} \qquad (12)$$

Here, since $\mathcal{S}'^{-1}_k \mathcal{H}'_k$ corresponds to ε, F[U] represents the number of eigenvalues, i.e., an eigenvalue number, in the effective energy region at a set k value.

Therefore, the number of eigenvalues for each k value, i.e., the second eigenvalue number, may be calculated in the second energy band structure calculated through the first reduced Hamiltonian $H_k'$ and the first reduced overlap matrix $S_k'$ using Equation 12. Likewise, the number of eigenvalues for each k value, i.e., the first eigenvalue number, may be calculated in the first energy band structure calculated from the initial Hamiltonian $H_k$ and the overlap matrix $S_k$.

The first and second eigenvalue numbers calculated using the above-mentioned method may be compared (S440), and the additional basis U' may be generated and added to the transformation matrix U when the second eigenvalue number is greater than the first eigen value number (S460). The additional basis U' may be calculated using Equation 13 below.

$$U' = \frac{1}{\sqrt{C^T C}} E_b C \text{ with } E_b = \begin{bmatrix} \zeta_1 \delta_{1b} \\ \zeta_2 \delta_{2b} \\ \zeta_3 \delta_{3b} \\ \zeta_4 \delta_{4b} \\ \zeta_5 \delta_{5b} \end{bmatrix} \qquad (13)$$

Here, U' denotes an additional basis added to the transformation matrix U, C denotes a variable vector, and $\Xi_b$ denotes an arbitrary matrix having an arbitrary size for removing the unphysical branches UPB. $\Xi_b$ may have a size of $N_{sc} \times N_r$, and C may have a size of $N_r \times 1$. In a product of $\Xi_b$ and C, the size of $N_r$ may be arbitrarily set. Therefore, the additional basis U' may be determined according to a value of the variable vector C. Furthermore, $$\delta_{i1} = \begin{cases} 1(i = j) \\ 0(i \neq j) \end{cases},$$

and b=1, 2, ..., NB, wherein $N_B$ denotes the number of unit cell, and, for example, $N_B$=5. $\zeta_b$ may be expressed as Equation 14 as below.

$$\zeta_b = \mathcal{U}_b \mathcal{S}_q^{-1} \mathcal{H}_q dU$$

with $\mathcal{U}_b = [(1-U_1U_1^+)\delta_{1b}(1-U_2U_2^+)\delta_{2b}(1-U_3U_3^+)$
$\delta_{3b}(1-U_4U_4^+)\delta_{4b}(1-U_5U_5^+)\delta_{5b}]$ (14)

Here, q denotes a wavenumber having an arbitrary number between $-\pi$ and $\pi$.

In an embodiment, the additional basis U' may be generated on the basis of the variable vector C that maximizes an absolute value of difference between the second eigenvalue number obtained by an ith transformation matrix (where i is a natural number) to which an ith additional basis is applied and the second eigenvalue number obtained by an (i−1)th transformation matrix to which an (i−1)th additional basis is applied. In other words, on the basis of Equation 12 for calculating an eigen value number (F[U]), the difference between the second eigenvalue numbers may be expressed as Equation 15 as below.

$$\Delta F = F[U_i] - F[U_{i-1}] \quad (15)$$

For example, when i=1, $\Delta F$ indicates a value obtained by subtracting the second eigenvalue of the initially calculated transformation matrix from the second eigenvalue of the transformation matrix to which the first additional basis U1' is added. That is, $\Delta F = F[U_0U_1'] - F[U_0]$ may be satisfied, wherein $\Delta F$ may be always output as a negative number, and the variable vector C that maximizes an absolute value of $\Delta F$ is required to be calculated. In other words, it is required to calculate the variable vector C that minimizes $\Delta F$. That is, the unphysical branches UPB may be maximally removed when $\Delta F$ is minimized.

When Equation 15 is expanded using Equation 12 and Equation 13, Equation 16 to Equation 18 may be calculated as below.

$$\Delta F(C) = Re\left\{ \frac{1}{n_z} \sum_{q=1}^{n_q} \sum_{j=1}^{n_z} \frac{C^T A(k_q, z_j)C}{C^T B(k_q, z_j)C}(z_j - \varepsilon_c) \right\} + (C^T C - 1)^2 \quad (16)$$

$$A(k,z) = \Xi_b^+(\Lambda_C U \tilde{\Lambda}^{-1} \tilde{S}_k \tilde{\Lambda}^{-1} U^+ \Lambda - S_k^+ U \tilde{\Lambda}^{-1} U^+ \Lambda - \Lambda_c U \tilde{\Lambda}^{-1} U^+ S_k + S_k)\Xi_b \quad (17)$$

$$\Lambda(k,z) = zS_k - H_k$$

$$\Lambda_c(k,z) = zS_k^+ - H_k^+$$

$$\tilde{\Lambda}(k,z) = z\tilde{S}_k - H_k \quad (18)$$

Here, matrices and scalar values except for the variable vector C may be fixed values, and a degree of removal of the unphysical branches UPB may be determined according to the value of the variable vector C. In order to find the variable vector C that minimizes an output of $\Delta F(C)$ in Equation 16, $\Delta F(C)$ may be set as an input value of a minimization technique (or minimization function) to calculate the variable vector C through the minimization technique. Any known minimization technique may be used. For example, the optimal variable vector C may be calculated from $\Delta F(C)$ using a minimization technique such as a conjugate gradient method. The ith additional basis (e.g., $U_i'$) may be calculated by applying the calculated variable vector C to Equation 13, and the ith transformation matrix $U_i$ to which the ith additional basis is applied may be calculated.

In an embodiment, the second eigenvalue number for the ith transformation matrix $U_i$ may be recalculated through Equation 9 and Equation 2 (S420), and may be compared with the first eigenvalue number again (S440). When the second eigenvalue number is greater than the first eigenvalue number, an (i+1)th additional basis may be calculated through the above-mentioned additional basis calculation operation, and an (i+1)th transformation matrix may be recalculated therefrom.

In this manner, the transformation matrix may be updated by repeating operations S420 to S460 until the second eigenvalue number converges to the first eigenvalue number.

When the second eigenvalue number converges to the first eigenvalue number, the initial transformation matrix U or the transformation matrix U to which the additional basis is added may be determined as the final transformation matrix (S480). That is, the final transformation matrix and the final energy band structure may be calculated by repeatedly removing the unphysical branches UPB.

Figure 4:
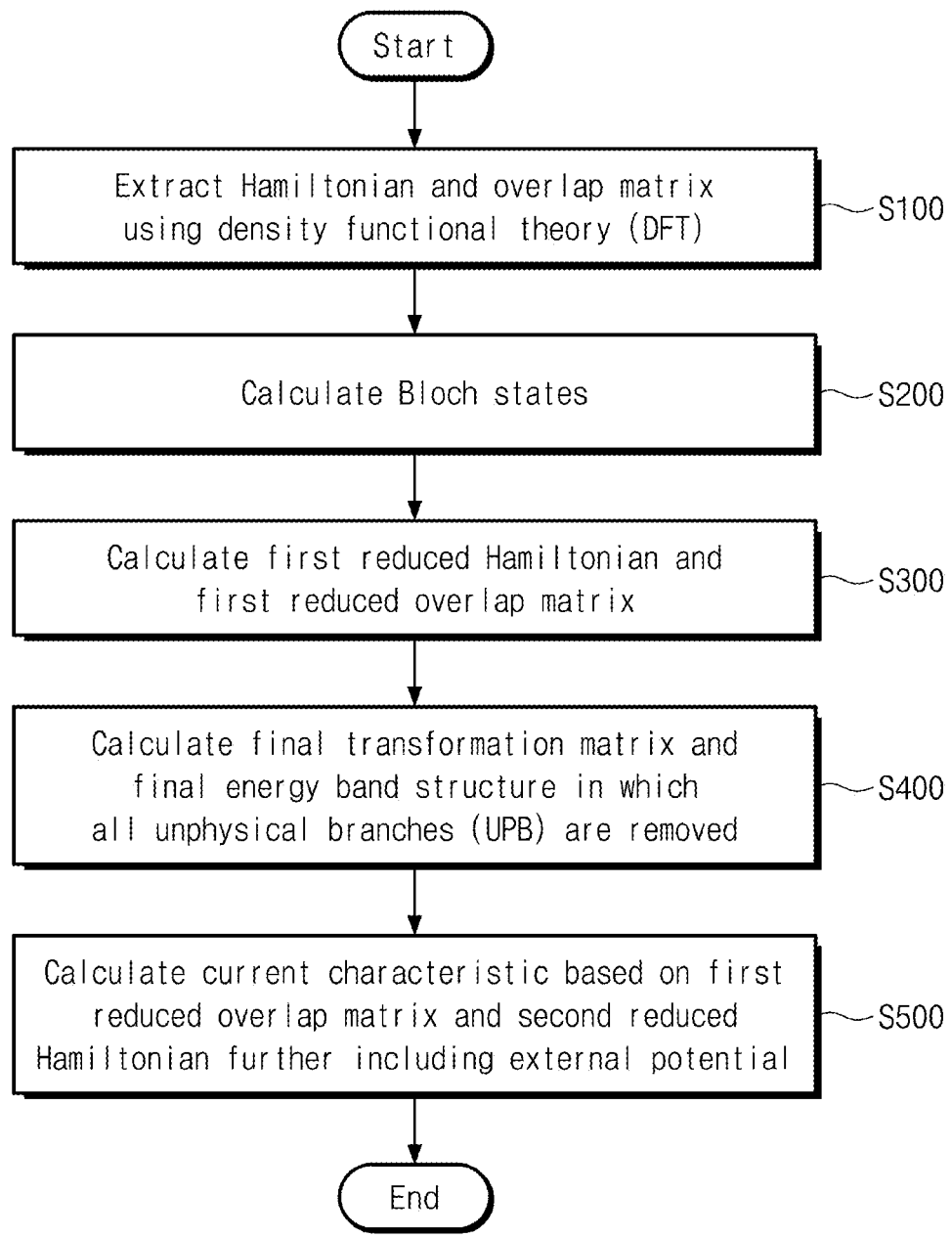
FIG. 4 is a flowchart illustrating a method for simulating a semiconductor device according to embodiments of the inventive concept.
Figure 5:
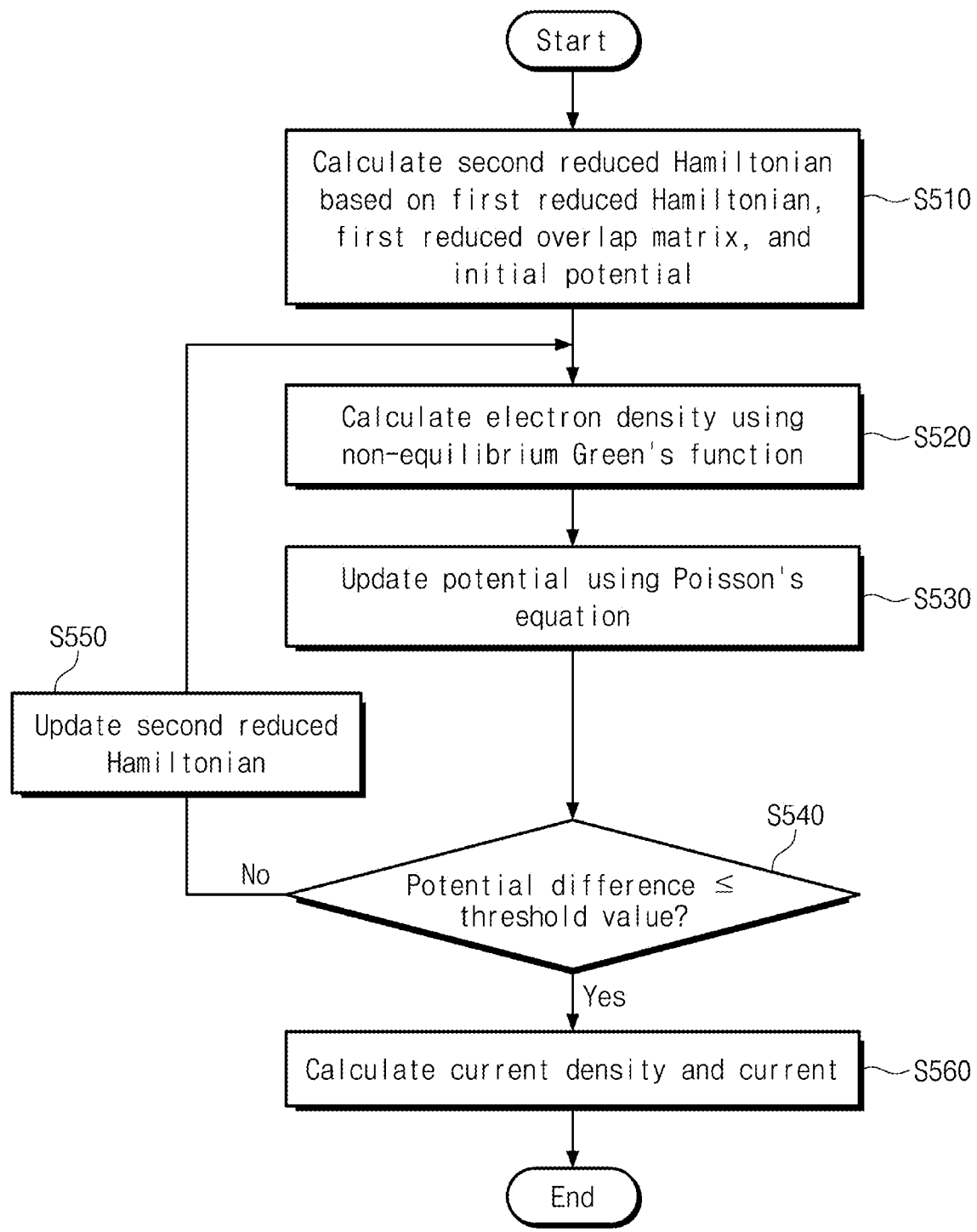
FIG. 5 is a flowchart illustrating a method for calculating a current characteristic in the method for simulating a semiconductor device according to embodiments of the inventive concept.

FIG. 4 is a flowchart illustrating a method for simulating a semiconductor device according to embodiments of the inventive concept. FIG. 5 is a flowchart illustrating a method for calculating a current characteristic in the method for simulating a semiconductor device according to embodiments of the inventive concept.

Referring to FIGS. 4 and 5, the method for simulating a semiconductor device according to the inventive concept may further include calculating a current characteristic of a target semiconductor device on the basis of a first reduced overlap matrix S' and a second reduced Hamiltonian H" further including an external potential ($\varphi$) component (S500), compared to the method for simulating a semiconductor device described above with reference to FIG. 1. For convenience, descriptions of above-described operations S100 to S400 will not be provided.

In an embodiment, the second reduced Hamiltonian H" with a reduced matrix size may be calculated on the basis of the first reduced Hamiltonian H' and the first reduced overlap matrix S' generated through operations S100 to S400 and an initial potential $\varphi$ that is a predetermined external potential component (S510), an electron density may be calculated by applying the second reduced Hamiltonian H" and the first reduced overlap matrix S' to an NEGF (S520), the initial potential may be updated by applying the electron density to a Poisson's equation (S530), and a potential difference between the initial potential and the updated potential of the second reduced Hamiltonian H" may be calculated (S540). A current density and a current may be calculated using the updated potential when the potential difference is equal to or less than a preset threshold value (S560). The second reduced Hamiltonian H" may be updated with the updated potential when the potential difference exceeds the threshold value (S550).

The second reduced Hamiltonian H" may be calculated on the basis of the initial potential $\varphi$, the first reduced Hamiltonian H', and the first reduced overlap matrix S' (S510). For example, the initial potential $\varphi$ may be a value in which an electrostatic effect, a strain effect, and the like are reflected. However, this is merely illustrative, and variables included in the potential are not limited thereto.

In an embodiment, a Schrodinger equation for the second reduced Hamiltonian H" may be expressed as Equation 19 as below.

$$\left(H_0 + \frac{1}{2}(SV + VS)\right)\Psi = ES\Psi \quad (19)$$

Here, $$H_0 + \frac{1}{2}(SV + VS)$$

denotes the second reduced Hamiltonian H" to which the initial potential φ is added, $H_0$ denotes the first reduced Hamiltonian H' based on interatomic interaction energy, S denotes the first reduced overlap matrix S', V denotes a potential matrix unitary-transformed with a final transformation matrix, E denotes an eigenvalue, and denotes a wave function.

In detail, the second reduced Hamiltonian H" may be expressed as Equation 20 and Equation 21 as below.

$$\mathcal{H} = \begin{pmatrix} H_{1,1} & H_{1,2} & 0 & \cdots \\ H_{2,1} & H_{2,2} & H_{2,3} & \\ 0 & H_{3,2} & \ddots & \\ \vdots & & & H_{N_x,N_x} \end{pmatrix} \quad (20)$$

$$H_{i,i} = H_0 + (S_0 V_i + V_i S_0)/2$$

$$H_{i,i+1} = W + (S_1 V_{i+1} + V_i S_1)/2$$

$$H_{i,i-1} = W^+ + S_1^+ V_{i-1} + V_i S_1^+)/2 \quad (21)$$

Accordingly, the second reduced Hamiltonian H" may represent a matrix to which both interaction energy between adjacent atoms and external potential are applied. When the size of an unit cell is $N_{uc}$, the Hamiltonian H and the overlap matrix S having the size of $N_{uc} \times N_{uc}$ may be transformed into the second reduced Hamiltonian H" and the first reduced overlap matrix S' having the size of $N_{mode} \times N_{mode}$ according to the above-mentioned reduction method.

Thereafter, the electron density may be calculated by applying the second reduced Hamiltonian H" and the first reduced overlap matrix S' to the NEGF (S520), the potential may be updated by applying the electron density to the Poisson's equation (S530), and the potential difference between the potential and the updated potential of the second reduced Hamiltonian H" may be calculated (S540). The second reduced Hamiltonian H" may be updated with the updated potential when the potential difference exceeds the threshold value (S550). In an embodiment, a hole density may be calculated instead of the electron density.

In an embodiment, the potential and the second reduced Hamiltonian H" may be updated by repeatedly solving the Poisson's equation and the NEGF in a self-consistent manner until the potential difference converges to the threshold value or less. Since the method for calculating the current density and the current using the self-consistent manner of the Poisson's equation and the NEGF is known, detailed descriptions thereof are not provided.

That is, according to the method for calculating current density and current according to embodiments of the inventive concept, voltage-current characteristics are calculated on the basis of a reduced Hamiltonian and a reduced overlap matrix achieved by reducing sizes of a Hamiltonian and an overlap matrix based on DFT, and thus a memory and calculation time may be remarkably reduced by DFT and TB methods.

Figure 6:
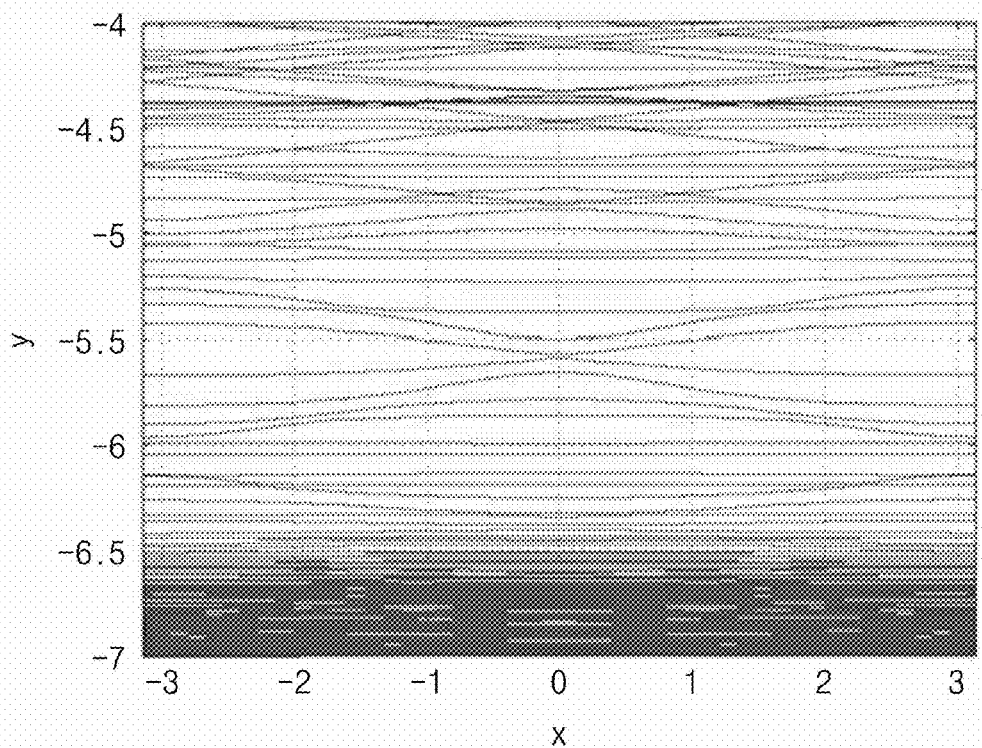
FIGS. 6 and 7 are graphs for describing an energy band structure calculated according to a method for simulating a semiconductor device according to embodiments of the inventive concept.
Figure 7:
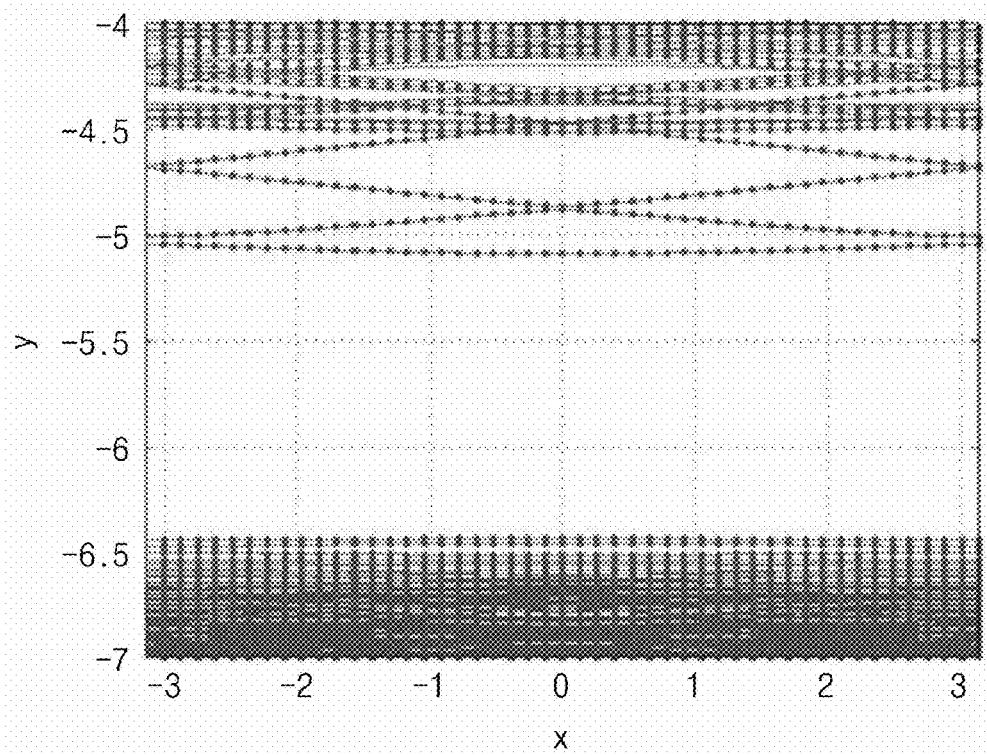

FIGS. 6 and 7 are graphs for describing an energy band structure calculated according to a method for simulating a semiconductor device according to embodiments of the inventive concept. In FIGS. 6 and 7, the x-axis represents wavenumber k, and the y-axis represents energy E.

FIGS. 6 and 7 respectively illustrate a band structure before removing the unphysical branch UPB and a band structure after removing the unphysical branch UPB. In FIG. 7, the solid lines indicate a band in which a reduced basis is used, and the dotted lines indicate a band in which full Hamiltonian is used. FIG. 7 shows that calculations of the two bands match in [−7, −4.48] that is a specified effective energy region.

The method for simulating a semiconductor device according to an embodiment of the inventive concept may remarkably reduce a memory and time required for calculation by significantly reducing the size of a Hamiltonian in a DFT-based transport calculation and energy band structure calculation. Therefore, various and accurate simulations for actual semiconductor device sizes may be implemented.

In more detail, the method for simulating a semiconductor device according to an embodiment of the inventive concept enables simulation of not only a homogeneous structure including a single material but also a non-homogeneous structure including two or more types of materials and semiconductor devices including such structures.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method for simulating a semiconductor device, the method comprising:

extracting a Hamiltonian and an overlap matrix of a target semiconductor device;

calculating, based on the Hamiltonian, the overlap matrix, and an energy-wavenumber relation within an effective energy region, each of Bloch states for each corresponding wave number and energy;

obtaining a first reduced Hamiltonian and a first reduced overlap matrix with a reduced matrix size by applying to the Hamiltonian and the overlap matrix a transformation matrix obtained by orthonormalizing a matrix representing the Bloch states;

calculating a final transformation matrix and a final energy band structure for the target semiconductor device, in which all of unphysical branches (UPB), which are energy bands not corresponding to a first energy band structure in a second energy band structure, are removed from the effective energy region by comparing the first energy band structure calculated based on the Hamiltonian and the overlap matrix with the second energy band structure calculated based on the first reduced Hamiltonian and the first reduced overlap matrix; and calculating a current characteristic of the semiconductor device based on a second reduced Hamiltonian and the first reduced overlap matrix, wherein the second reduced Hamiltonian is obtained by adding an initial external potential to the first reduced Hamiltonian and the first reduced overlap matrix, wherein the semiconductor device comprises a source region, a drain region, and a channel region between the source region and the drain region, wherein the channel region comprises a plurality of heterogeneous unit cells, each of which at least one of includes different material or has different structure.

2. The method of claim 1, wherein the unit cells have a structure that is symmetric with respect to a center of the channel region.

3. The method of claim 1, wherein the unit cells have a structure that is asymmetric with respect to a center of the channel region.

4. The method of claim 1, wherein removing the unphysical branches is performed by:
checking whether the unphysical branches exist in the effective energy region of a periodic super cell structure including the plurality of heterogeneous unit cells; and
repeating a band calculation by sequentially updating the transformation matrix for the unit cells if the unphysical branches exist.

5. The method of claim 1, wherein the calculating of the final transformation matrix and the final energy band structure comprises:
calculating a second eigenvalue number that is a number of eigenvalues included in the second energy band structure;
comparing the second eigenvalue number with a first eigenvalue number that is a number of eigenvalues included in the first energy band structure;
generating an additional basis for removing the unphysical branches from the effective energy region and adding the additional basis to the transformation matrix when the second eigenvalue number is greater than the first eigenvalue number; and
determining the transformation matrix to which the additional basis is added as the final transformation matrix when the second eigenvalue number converges to the first eigenvalue number.

6. The method of claim 5, wherein the adding of the additional basis to the transformation matrix comprises:
recalculating the second eigenvalue number in an energy band obtained by the transformation matrix to which the additional basis is added; and
generating a new additional basis for removing the unphysical branches from the effective energy region and further adding the new additional basis to the transformation matrix, if the recalculated second eigenvalue number is greater than the first eigenvalue number.

7. The method of claim 5, wherein the adding of the additional basis to the transformation matrix is performed through repetition of recalculating the second eigenvalue number and generating and adding the additional basis to the transformation matrix, until the second eigenvalue number converges to the first eigenvalue number.

8. The method of claim 7, wherein the additional basis is generated based on a variable vector calculated through a minimization function that maximizes an absolute value of a difference between the second eigenvalue number obtained by an $i^{th}$ transformation matrix (where i is a natural number) to which an $i^{th}$ additional basis is applied and the second eigenvalue number obtained by an $(i-1)^{th}$ transformation matrix to which an $(i-1)^{th}$ additional basis is applied.

9. The method of claim 1, wherein the obtaining of the first reduced Hamiltonian and the first reduced overlap matrix comprises:
generating an orthonormal basis obtained by orthonormalizing the matrix representing the Bloch states;
outputting the transformation matrix in which states not meeting a preset threshold value are removed from the orthonormal matrix; and
outputting the first reduced Hamiltonian and the first reduced overlap matrix by applying the transformation matrix to the Hamiltonian and the overlap matrix.

10. The method of claim 1, wherein the effective energy region is set based on at least one of a conduction band edge or a valence band edge according to a type of the semiconductor device.

11. The method of claim 1, wherein each of the Bloch states is calculated from the Hamiltonian and the overlap matrix using an eigenvalue solving method for a Schrodinger equation.

12. The method of claim 1, wherein the calculating of the current characteristic of the semiconductor device comprises:
obtaining the second reduced Hamiltonian based on the first reduced Hamiltonian, the first reduced overlap matrix, and the initial potential;
calculating an electron density by applying the second reduced Hamiltonian and the first reduced overlap matrix to a non-equilibrium Green's function (NEGF);
updating the initial potential by applying the electron density to a Poisson's equation;
calculating a potential difference between the initial potential and the updated potential of the second reduced Hamiltonian;
calculating a current density and a current using the updated potential when the potential difference is equal to or less than a predetermined threshold value; and
updating the second reduced Hamiltonian with the updated potential when the potential difference exceeds the threshold value.

13. The method of claim 12, wherein the potential and the second reduced Hamiltonian are updated by repeatedly solving the Poisson's equation and the NEGF in a self-consistent manner until the potential difference converges to the threshold value or less.

14. The method of claim 1, wherein the semiconductor device is a field-effect transistor having a structure of bulk, ultra-thin body (UTB), fin, nanowire, or gate-all-around (GAA).

* * * * *